(12) United States Patent
Ono

(10) Patent No.: US 6,533,421 B2
(45) Date of Patent: Mar. 18, 2003

(54) PROJECTION APPARATUS AND COOLING METHOD OF PROJECTION APPARATUS

(75) Inventor: Hiroyuki Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/778,366

(22) Filed: Feb. 7, 2001

(65) Prior Publication Data

US 2001/0022650 A1 Sep. 20, 2001

(30) Foreign Application Priority Data

Feb. 9, 2000 (JP) .................................. 2000-038114

(51) Int. Cl.⁷ .................. G03B 21/18; G03B 21/22; G03B 21/14; H04N 5/64
(52) U.S. Cl. .................. 353/61; 353/60; 353/74; 353/77; 353/119; 348/836; 348/843
(58) Field of Search .................. 353/60, 61, 119, 353/74, 75, 76, 77, 78, 57, 58; 348/836, 843

(56) References Cited

U.S. PATENT DOCUMENTS

| 4,131,346 A | | 12/1978 | Dieckhoff .................. 353/15 |
| 4,243,307 A | | 1/1981 | Rizzuto .................. 353/57 |
| 5,639,151 A | * | 6/1997 | McNelley et al. .................. 353/98 |
| 5,808,704 A | * | 9/1998 | Yoshikawa et al. .................. 348/748 |
| 5,993,011 A | * | 11/1999 | Smock et al. .................. 353/119 |
| 6,394,608 B1 | * | 5/2002 | Shiraishi et al. .................. 353/57 |
| 6,398,366 B1 | * | 6/2002 | Hara et al. .................. 353/57 |

FOREIGN PATENT DOCUMENTS

DE           197 23 273          12/1998          ........... G03B/21/14

* cited by examiner

Primary Examiner—Russell Adams
Assistant Examiner—Melissa Koval
(74) Attorney, Agent, or Firm—Frommer Lawrence & Haug LLP; William S. Frommer; Matthew K. Ryan

(57) ABSTRACT

A projection apparatus including an optical unit for magnifying and projecting an image by using light of a light source and a reflecting member for reflecting the projected image from the optical unit. This projected image is reflected by the reflecting member onto a rear surface of a screen. The projection apparatus further includes a housing containing the light source and which has a plurality of housing surfaces and an air exhausting member for discharging interior heat of the housing with the air exhausting member including an air passage. First and second aperture sections are provided on different housing surfaces from each other for exhausting air from the housing. These first and second aperture sections communicate with the same air passage but are respectively exhausting air from the same air passage in generally perpendicular air path directions.

8 Claims, 8 Drawing Sheets

PROJECTION APPARATUS AND COOLING METHOD OF PROJECTION APPARATUS

BACKGROUND OF THE INVENTION

1. Field of the Invention

The present invention relates to an improvement of a projection apparatus utilizing light of a light source contained in a housing and projecting an image.

2. Description of the Related Art

In a projection apparatus, there is a so-to-speak rear surface projection type projecting an image from a rear surface of a screen. Hereinafter, the rear surface projection type projection apparatus is simply called "a projection apparatus". The projection apparatus is superior to a TV set utilizing a cathode-ray tube in terms of small depth in comparison with the TV set, and it is capable of realizing a size reduction more than the TV set utilizing the cathode-ray tube, as a whole, even if a display area is formed to be large.

FIG. 1 shows a perspective view illustrating an example of a constitution for a related projection apparatus. A projection apparatus 1100 has a screen 1061 projected with an image, and a mirror 1062 for reflecting the image, and includes an optical unit 1104. This optical unit 1104 has a lamp house section, not illustrated, of a lamp to serve as light source, a fan, and a control section therefor.

The optical unit 1104 is provided with liquid crystal sections and a projection lens of portions, for example, for three colors of red, green and blue (RGB). The lamp house section is provided with the light source for irradiating light to the optical unit 1104. The fan is an apparatus for circulating air inside the duct provided in the interior of the projection apparatus 1100, and for discharging interior heat to an exterior. A prescribed air outlet is provided on a rear surface of the projection apparatus 1100, and heat inside the duct is discharged to the exterior from the air outlet by means of the fan.

The projection apparatus 1100 forms an image out of light from the light source via the liquid crystal section, under a constitution described above, magnifies the image by means of the projection lens of the optical unit 1104, reflects the projected image by the mirror, and projects the projected image on the screen. The light source generates heat and the projection apparatus 1100 discharges the interior heat to the exterior from the air outlet by means of the fan.

In the related projection apparatus 1100, since there is only one air outlet, in a case where the projection apparatus is installed, when the projection apparatus is utilized in such a blocked state as that a surface provided with the air contact with a wall or the like, and interior temperature is elevated because the interior heat is not discharged to the exterior. When the projection apparatus is utilized in a state described above, there is such a case that a failure has been caused due to elevation of the interior temperature.

It is an object of the present invention to provide a projection apparatus capable of efficiently discharging the interior heat to the exterior, and maintaining the interior temperature to appropriate temperature in order to resolve the problems described above.

SUMMARY OF THE INVENTION

According to one aspect of the present invention, the object described above can be achieved by means of a projection apparatus wherein in the projection apparatus having an optical unit for magnifying and projecting an image by using light of a light source, a reflecting means for reflecting the projected image from the optical unit, and a screen projected with the projected image from the reflecting means from a rear surface, wherein the projection apparatus further includes a housing containing the light source and having a plurality of surfaces, and an air exhausting means for discharging the interior heat of the housing, wherein at least one of the air outlets is respectively provided on a plurality of surfaces of the housing on surfaces different from each other.

According to a constitution of the aspect, an optical unit magnifies and projects an image by using light of a light source. A reflecting means reflects the projected image from the optical unit, and a screen is projected from rear surface the projected image, wherein the projection apparatus discharges the interior heat of the projection apparatus from the other air outlet even if one of the air outlets is blocked by means of a wall or the like. Accordingly, the projection apparatus discharges efficiently the interior heat to the exterior, and capable of appropriately maintaining the interior temperature.

According to another aspect of the present invention, at least one of the air outlets is provided on a bottom surface side of the housing to form a passage of heat between an arrangement surface and a bottom surface when the housing is arranged.

According to a constitution of the aspect, even up to a side surface or a rear surface is blocked by means of an adjacent wall or the like, interior heat of the projection apparatus is discharged from an air outlet provided on a bottom section side of the housing via a prescribed passage. Accordingly, since air exhaust is appropriately carried out, even if the side surface or the rear surface is covered, the projection apparatus efficiently discharges interior heat to exterior, so that interior temperature can appropriately be maintained.

According to another aspect of the present invention, at least one of the air outlets is provided on a rear surface side of the housing According to still another aspect of the present invention, the air outlets include a first air outlet provided on a first surface out of a plurality of surfaces of the housing described above, and a second outlet provided on a second surface except the first surface of the housing described above.

According to still another aspect of the present invention, in a case where the first air outlet is blocked, the interior heat of the projection apparatus is discharged from the second air outlet. Accordingly, the projection apparatus discharges the interior heat efficiently to the exterior, thereby enables the interior temperature to be maintained in an appropriate state.

DETAILED DESCRIPTION OF THE PREFERRED EMBODIMENTS

Hereinafter, favorable embodiments of the present invention will be described in detail based on the attached drawings.

In the mean time, since embodiments described hereinafter are favorable concrete examples of the present invention, various and technically preferred limitations are imposed on a scope of the invention, however, in the explanation hereinafter, unless there is any specific description of limiting the scope of the invention, the present invention is not intended to be limited to these embodiments.

Figure 1:
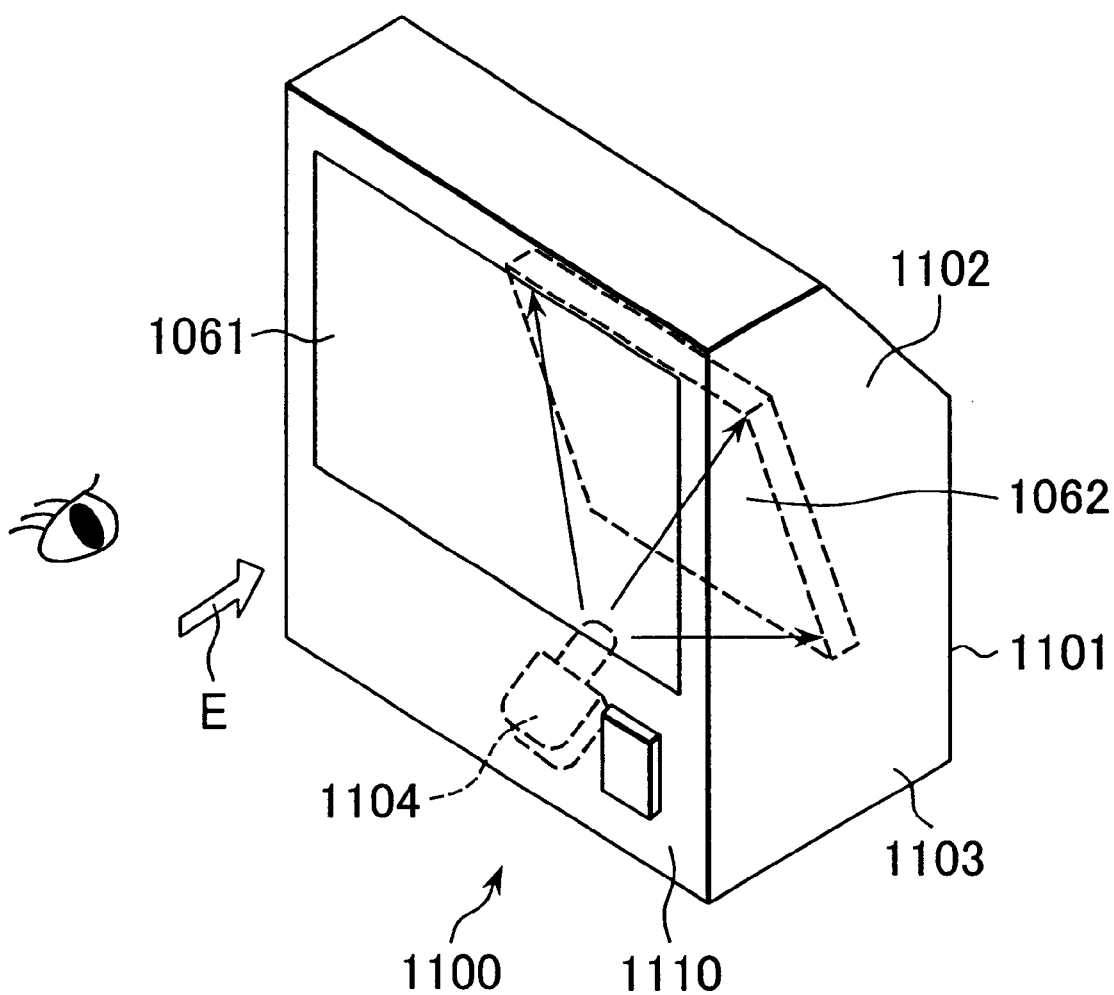
FIG. 1 shows a perspective view illustrating an example of a constitution for a related projection apparatus.
Figure 2:
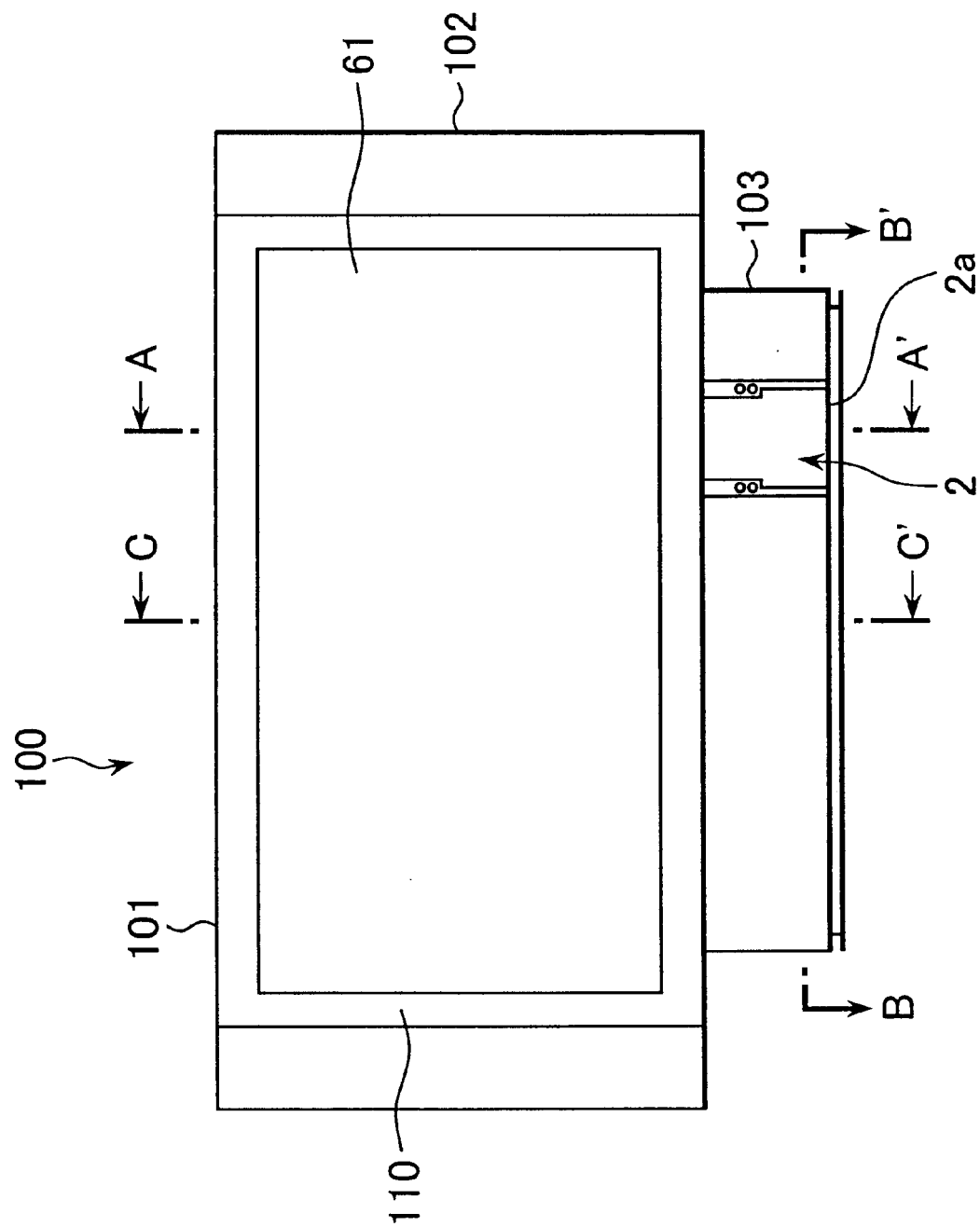
FIG. 2 shows a front view illustrating an example of constitution of a projection apparatus as a preferred embodiment of the present invention.

FIG. 2 shows a front view illustrating an example of constitution of a projection apparatus as a preferred embodiment of the present invention.

The projection apparatus 100 has such a constitution as vertically separable substantially at its intermediate portion, and is composed of an upper section cabinet 102 and a lower section cabinet 103. The upper section cabinet 102 and the lower ;section cabinet 103 are formed respectively in an independent state, and the upper section cabinet 102 is constituted to be assembled relative to the lower section cabinet 103.

The upper section cabinet 102 is mounted with a screen 61 in a front surface section 110 of a housing 101 in a shape of rectangular parallelepiped. Further, the housing 101 is formed in a box shape an interior thereof is a cavity, as a whole, and a circumference thereof is closed by means of an upper surface wall, both side surface walls, a rear surface wall and a bottom surface wall. The upper surface wall and both the side surface walls are inclined to a rear surface side of the wall, and the inclined surface of the upper surface wall is provided with the mirror illustrated in FIG. 3 to be parallel to the inclined surface. As illustrated in FIG. 4, in particular, the inclined surface wall is formed of a state having an inclination angle previously calculated taking into account a positional relationship preset between the screen 61 mounted on the front surface section 110 of the housing 101 and reflection of an image by means of a projection lens, which will be described later.

The entire equipment components necessitated as the projection apparatus 100 are installed in the lower section cabinet 103 except the screen 61 and the mirror provided in the upper section cabinet 102 described above. In an interior of the lower section cabinet 103, a projected image equipment including three pieces of liquid crystal section and their drive circuit as a main component section, for example, and the projection lens are provided substantially in the central section, a light source 2 is provided detachably at a position either left or right of the central section of the lower section cabinet 103 (in the present embodiment, it is on a right side). The light source 2 can be inserted into or removed from a lamp insertion port 2a.

The liquid crystal section described above is brought into high picture quality by utilizing three pieces of, for example, small sized and highly precisely formed polysilicon TFT liquid crystal panels which are portions of three colors for red, green and blue RGB and constitutes so-to-speak an optical unit including the projection lens. As the drive circuit described above, the circuit mounted with a plurality of necessary electronic components on a printed circuit board, for example, is employed.

The light source 2 described above utilizes, for example, a high intensity discharge lamp with high performance (HID lamp), the whole are made in cartridge types, and are constituted to be easily replaceable from the lamp inserting port 2a. A front surface of the lower section cabinet 103 including the light source 2 and the lamp insertion port 2a is covered by prescribed panel, not illustrated.

Figure 3:
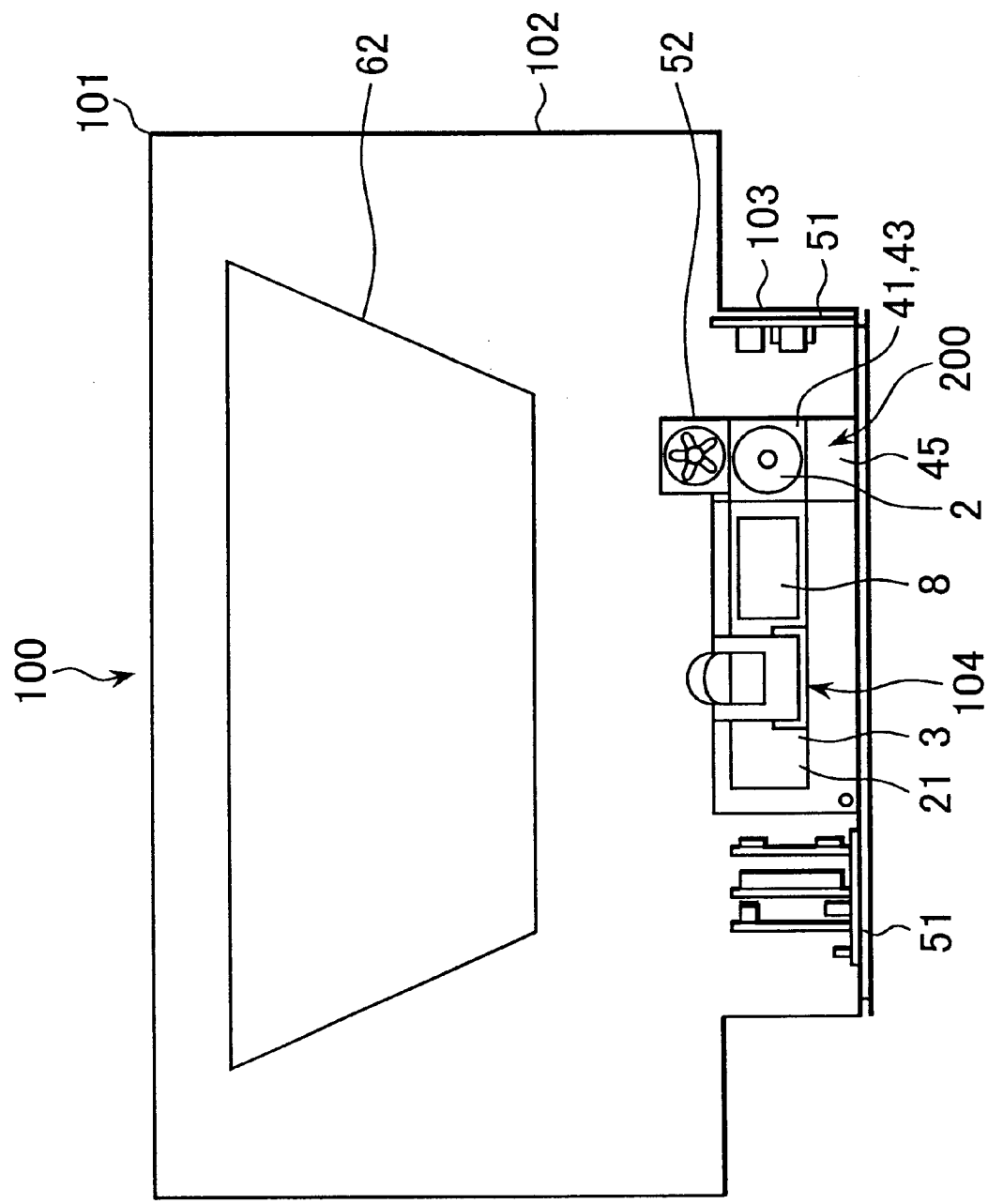
FIG. 3 shows a section view illustrating an example of an interior constitution of the projection apparatus in FIG. 2 in a case where it is viewed from the front.
Figure 4:
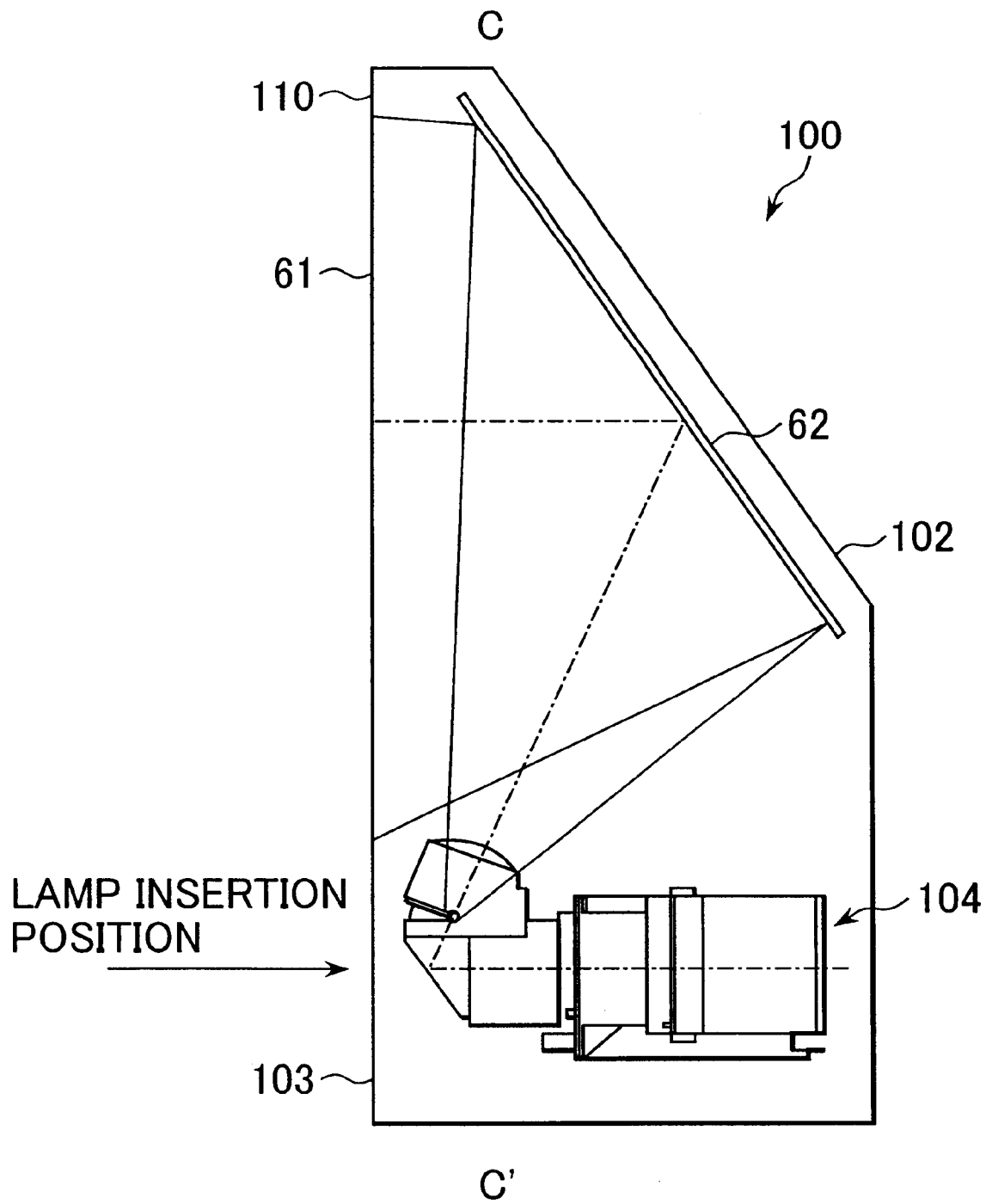
FIG. 4 shows a section view illustrating an example of a rough constitution of the projection apparatus in FIG. 2 in a case where it is sectioned on line C–C' in FIG. 2.

FIG. 3 shows a section view illustrating an example of an interior constitution of the projection apparatus in FIG. 2 in a case where it is viewed from the front.

The lower section cabinet 103 has an electric circuit 51, an optical unit 104, and a light source section 200 (light source 2). The optical unit 104 is provided substantially at a center lower section of the lower section cabinet 103. The electric circuit 51 is provided respectively, for example, on the left side and right side of the optical unit 104. The light source section 200 has the light source 2, a fan 52 (air exhausting means), and a case 45. The fan 52 is used for cooling the light source 2 and the like. Heat generated by the light source 2 of the light source section 200 and the like is emitted from air an outlet, which will be described later, to the exterior.

FIG. 4 shows a section view illustrating an example of a rough constitution of the projection apparatus in FIG. 2 in a case where it is sectioned on line C–C'.

As described above, a mirror 62 (reflecting means) is provided in parallel along the inclined surface of the upper surface wall of the upper section cabinet 102, a projected image from the optical unit 104 is reflected on a rear surface of a screen 61. The projection apparatus 100 projects a magnified and projected image on the screen 61 after the projected image from the optical unit 104 fixed to a prescribed base section, not illustrated, is reflected by means of the mirror 62. With the constitution described above, the magnified and projected image is displayed on the screen 61 on a side of a front surface 110 of the projection apparatus 100.

Figure 5:
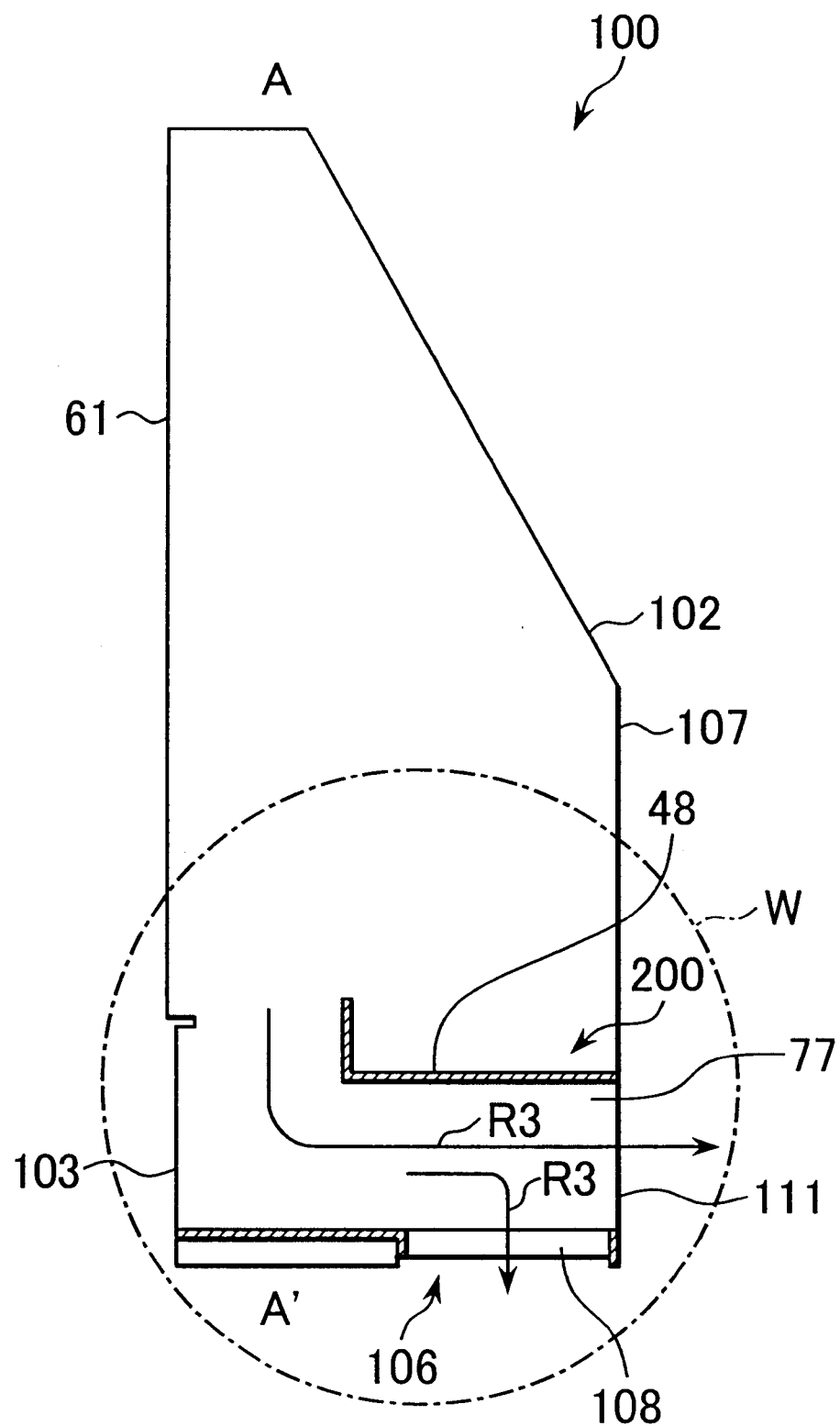
FIG. 5 shows a section view illustrating an example of a rough constitution of the projection apparatus in FIG. 2 in a case where it is sectioned on line A–A' in FIG. 2.

FIG. 5 shows a section view illustrating an example of a rough constitution of the projection apparatus in FIG. 2 in a case where it is sectioned on line A–A' in FIG. 2.

Referring to a scope W, the projection apparatus 100 is provided with the light source section 200 as illustrated in FIG. 3. At a lower section of the light source section 200, an air exhaust duct 48 is provided for emitting heat of the light source 2 and the like described above, and an air passage 77 is formed by means of the air exhausted duct 48. An airflow R3 is generated inside the air passage 77 by means of the fan 52 illustrated in FIG. 3, described above.

This projection apparatus 100 includes the housing 101 having a plurality of faces, and a first aperture section 111 (air outlet, a first air outlet) communicating with an air passage 77 (air exhaust means) is provided on either surface of the housing 101, for example, a rear surface section 107 (a first surface).

This projection apparatus 100 is characterized in that a second aperture section 108 (air outlet, a second outlet) other than the first aperture section 111 communicated with the air passage 77 is provided on a surface different from a surface where the first aperture section 111 is provided, for example, on a bottom surface section 106 (a second surface). In the meantime, the second aperture section 108 may well be provided on the surface other than the bottom surface section 106 described above. Further, the second aperture section 108 may well have such a constitution that a plurality of the second aperture sections 108 are provided on the housing 101, and these aperture sections may have a constitution where they are provided on the respectively different surfaces, or may well have a constitution where they are provided on an identical surface.

The second aperture section 108 communicates with the first aperture section 111, for example, in the air passage 77. The first aperture section 111 is the section for discharging heat to the rear surface section 107 side of the projection apparatus 110, however in contrast with that, the second aperture section 108 is the section for discharging heat to the bottom surface section 106 side. The bottom surface section 106 of the projection apparatus 100 has such a constitution as holding a slight clearance for releasing heat, so that heat is never to be confined.

In the projection apparatus 100, when a plurality of air outlets are provided as described above, even if the first aperture section 111 is covered with a wall or the like, for example, in the projection apparatus 100, it is appropriately discharged from the second aperture section 108. Further, on the contrary to that, even if the second aperture section 108 is covered by something in the projection apparatus 100, heat is appropriately discharged from the first aperture section 111. Accordingly, in the projection apparatus 100, even if either of the aperture sections is covered, interior heat can efficiently be discharged, so that interior temperature of the housing 101 can be appropriately held by means of the fan 52

The projection apparatus 100, except the constitution described above, may well have a constitution as illustrated hereinafter.

Figure 6:
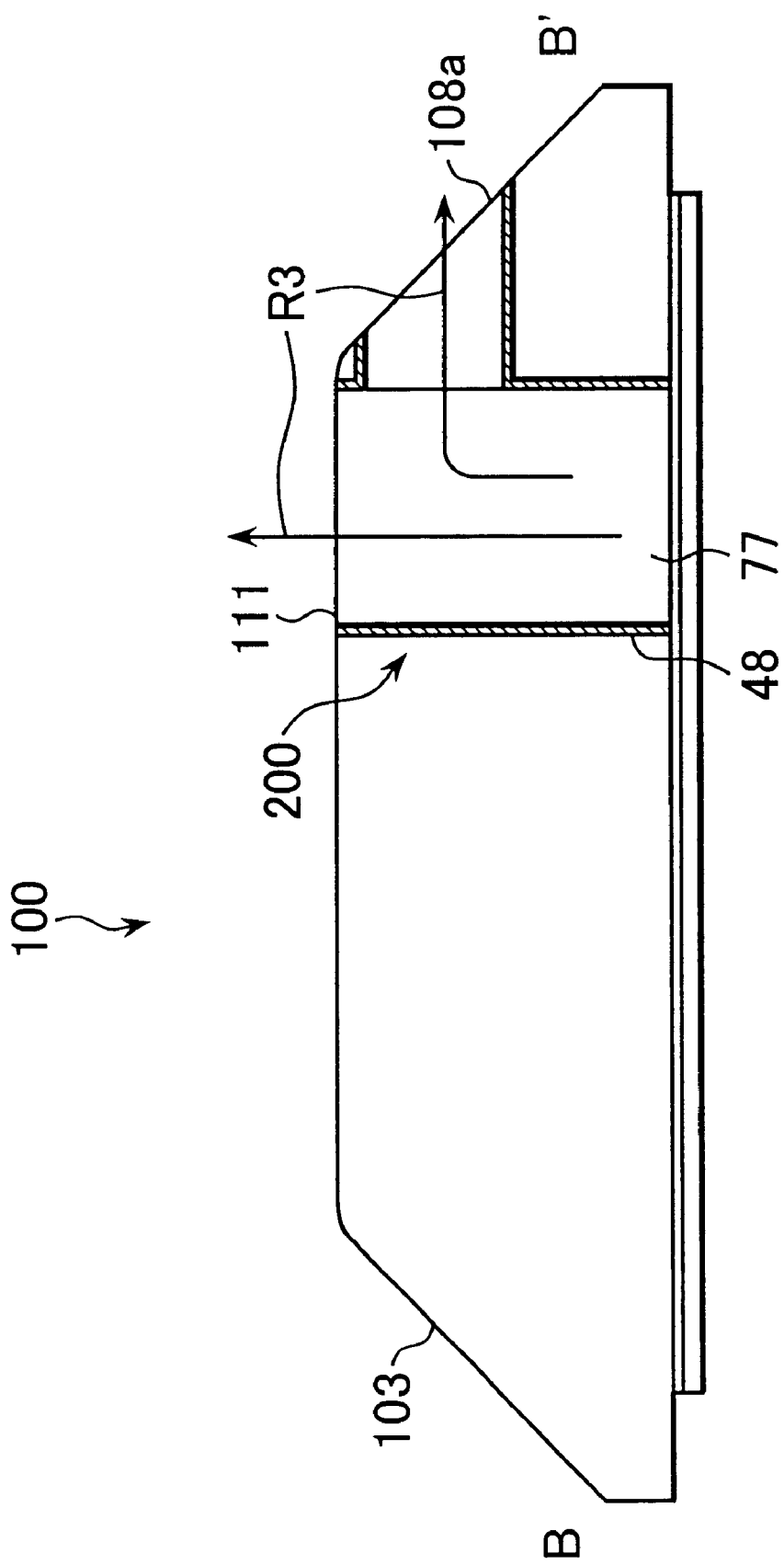
FIG. 6 shows a section view illustrating an another example of a rough constitution of the projection apparatus in FIG. 2 in a case where it is sectioned on line B–B' in FIG. 2.

FIG. 6 shows a section view illustrating an another example of a rough constitution of the projection apparatus in FIG. 2 in a case where it is sectioned on line B–B' in FIG. 2.

In projection apparatus 100, a second aperture section 108a (air outlet, the second air outlet) may well have such a constitution as that the air outlet is provided on either of one side of the side surface sections or the air outlets are provided on both sides of the side surface sections. With the constitution described above, the projection apparatus 100 can achieve similar effect to that in the case of the constitution described above.

Figure 7:
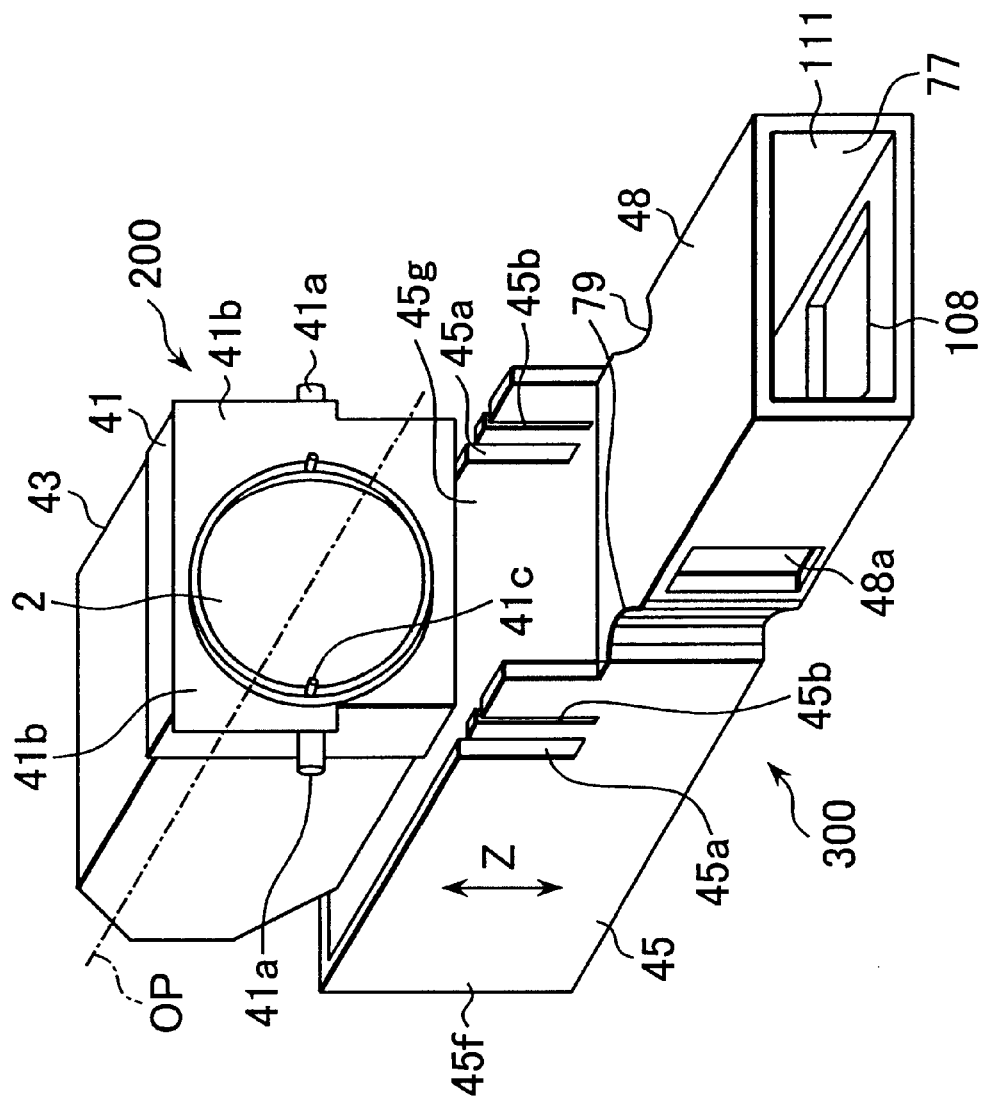
FIG. 7 shows a perspective view illustrating an example of a detailed exploded constitution for a light source section and a case in FIG. 3.

FIG. 7 shows a perspective view illustrating an example of a detailed exploded constitution of the light source section 200 and the case 45 in FIG. 3.

Figure 8:
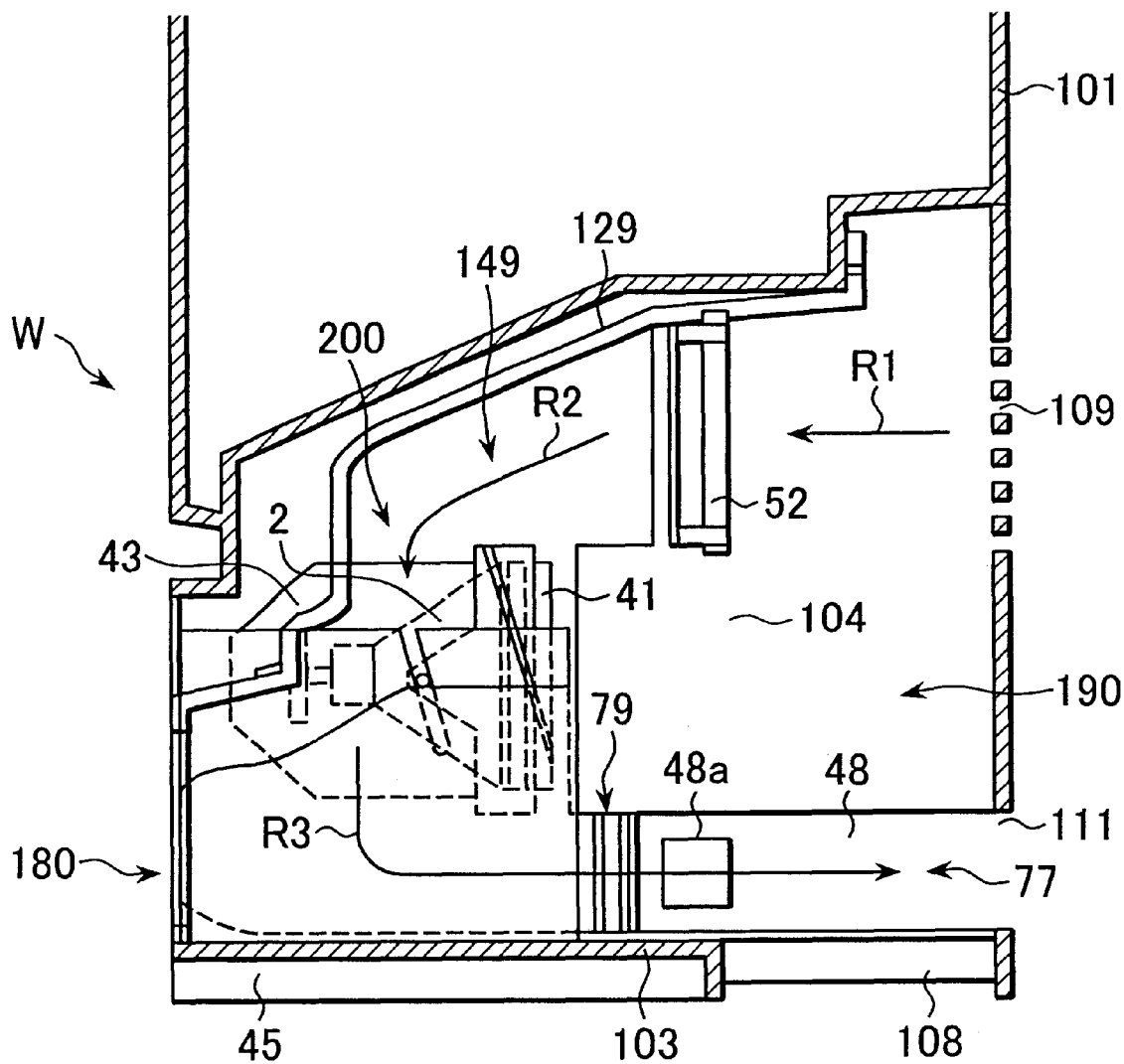
FIG. 8 shows a section view illustrating an example of constitution wherein a light source section and a case in FIG. 7 are contained in a lower section of a housing in FIG. 3.

FIG. 8 shows a section view illustrating an example of constitution wherein the light source section 200 and the case 45 in FIG. 7 are contained in a lower section of the housing 101 in FIG. 3 and are equivalent to the scope W in FIG. 5.

The light source section 200 and the case 45 constitute a light-source mounting device 300. The light source section 200 has a light source holder 41 and a light source case 43. The light source holder 41 has two pieces of pins 41a and 41a, and two pieces of ribs 41b and 41b.

The pins 41a and 41a are protruded toward in an opposite direction along in a direction (in an horizontal direction) to cross at light angle with respect to an optical axis OP of the light source 2. The ribs 41b and 41b have a shape of bilateral symmetry around the optical axis OP, the rib 41b and 41b are formed to be parallel in a Z direction.

The case 45 is the case capable of containing the light source section 200 as illustrated in FIG. 6, and has oblong grooves 45a and 45b. These oblong grooves 45a and 45b are formed to be in parallel to a Z direction which is a vertical direction. The oblong grooves 45a and 45b are formed respectively in the Z direction on wall surfaces 45f and 45g of the case 45. The Z direction is the vertical direction relative to the optical axis OP.

The pins 41a of the light source holder 41 is respectively fitted in the oblong grooves 45a. The ribs 41b of the light source holder 41 are fitted in the oblong grooves 45b. This light source holder 41 together with the light source 2 can be positioned by moving in a upper direction along the long grooves 45a and 45b by means of a member having a cam, for example, not illustrated and by lifting from an entrance position 180 of the light source 2 illustrated in FIG. 8 to a regular position 190 (to a mounting position of the light source relative to the optical unit 104).

The case 45 is formed to be substantially U in shape, for example, viewed in section, and has an air exhaust duct 48 (air exhaust means). The case 45 and the air exhaust duct 48 are formed of an air exhaust passage for cooling light source holder 41, a light source case 43, and a light source 2 of the light source section 200.

The air exhaust duct 48 is integrally formed with the case 45, and the air exhaust duct 48 has a section of an air passage 77 being substantially rectangular in shape as illustrated in FIG. 7. In a midway of the air passage 77 of the air exhaust duct 48 are preferably formed of an air throttle portion 79 and two aperture sections 48a and 48a. Specifically, the projection apparatus 100 is formed in a shape after increasing flow speed of air flowing the interior by throttling one section of the air exhaust duct 48 by means of an air throttle portion 79 and then widening the duct, and is constituted so as to open the aperture section 48a of an appropriate dimension on a side surface of the widened portion of the duct. Accordingly, the projection apparatus 100 can draw in much more exterior cold air of the air exhaust duct 48 through the aperture section 48a. With the constitution described above, the projection apparatus 100 is capable of decreasing in exhaust temperature of air cooled the light source 2 and discharged from the air exhaust duct 48.

As illustrated in FIG. 8, in an upper section of the optical unit 104, the fan 52 is provided for sucking outside air from exterior of the housing 101 through the aperture section 109. The fan 52 resides in the midway of a guiding duct 149 (air exhaust means) formed of the housing 101 and a partitioning plate 129. The fan 52 is the fan for intake which supplies air taken in from the aperture section 109 of the upper section on the rear side of the housing 101 to the light source section 200 side.

The fan 52, the light source section 200, the case 45, and the air exhaust duct 48 are contained in the lower section cabinet 103 of the housing 101. The end section of the air exhaust duct 48 is connected to the first aperture section 111 and the second aperture section 108 of the lower section on the rear side of the lower section cabinet 103 as described above.

The projection apparatus 100 has the constitution described above, and next a cooling operation of the light source 2 of the light source section 200 will be explained with reference to FIG. 2 through FIG. 8.

Cooling air fed by the fan 52 for cooling, is passed along in a R1 direction and R2 direction as illustrated in FIG. 8 through the guiding duct 149 formed in the housing 101 and the partitioning plate 129, and fed to the light source 2. A passage is structured in such a manner as that air taken away and warmed by heat generated by the light source 2 is passed through the lower section of the light source holder 41, goes through the interior of the case 45 along in a R3 direction and the air exhaust duct 48 and is guided from either of the first aperture section 111 and the second aperture section 108 or both of them and to the exterior. Here, even if the first aperture section 111 is covered by something, air is guided to the exterior of the housing 101 from the second aperture section 108.

According to the embodiment of the present invention, in the projection apparatus 100, even if the first aperture 111 is covered, interior heat can be discharged from the second aperture 108. Accordingly, in the projection apparatus 100, even if the first aperture 111 is covered, interior temperature can appropriately be maintained. As a contrary, further, the projection apparatus 100 can discharge interior heat from the first aperture 111 even if the second aperture is covered. Accordingly, the projection apparatus 100 can appropriately maintain interior temperature even in a case where the second aperture 108 is covered.

The present invention will not be limited to the embodiments described above.

In respective constitution of the embodiments described above, part of the constitution can be omitted or the part of the constitution can be combined optionally to be different from the manner described above.

Further, the embodiments described above is the projection apparatus of three plate piece type having three pieces of liquid crystal light bulb, not limited to that, and single plate type projection apparatus may, of course, have a single piece of liquid crystal light bulb. In the meantime, the housing 101 can have various shapes not only in the shape illustrated in drawings.

Further, the housing 101 may have a round shape, as a whole, not limited to a shape constituted by a typical polyhedron as shown in the embodiment described above. In this case, the housing is included in the scope of the present invention if the housing 101 has a curved face confronting to spatially a plurality of directions and is formed of the air outlets corresponding to these plurality of directions.

Still further, it is to be understood that the embodiments described above may be applied to a projection apparatus except the rear face projection type arrangement.

What is claimed is:

1. A projection apparatus comprising:
an optical unit for magnifying and projecting an image by using light of a light source,
reflecting means for reflecting said projected image from said optical unit, and
a screen projected with said projected image from said reflecting means from its rear surface, wherein:
said projection apparatus further includes a housing containing said light source and having a plurality of housing surfaces, and air exhausting means for discharging interior heat of said housing with said air exhausting means including a defined and enclosed air passage, and
first and second aperture sections provided on different housing surfaces from each other for exhausting air from said housing, said first and second aperture sections communicating with the same said defined and enclosed air passage but respectively exhausting air from the same said air passage in generally perpendicular air path directions.

2. A projection apparatus as claimed in claim 1, wherein at least one of said air outlets is provided on a bottom surface side of said housing so as to form said passage of heat between an arrangement surface and a bottom surface when said housing is arranged.

3. A projection apparatus as claimed in claim 2, wherein at least one of said air outlets being provided on a rear surface side of said housing.

4. A projection apparatus as claimed in claim 1, wherein said air outlets include a first air outlet provided on a first surface out of a plurality of surfaces of said housing, and a second air outlet provided on a second surface except said first surface of said housing.

5. A cooling method for a projection apparatus which comprises:
an optical unit for magnifying and projecting an image by using light of a light source,
reflecting means for reflecting said projected image from said optical unit, and
a screen projected with said projected image from said reflecting means from its rear surface, wherein:
said projecting apparatus further includes a housing containing said light source and having a plurality of housing surfaces, and air exhausting means for discharging interior heat of said housing with said air exhausting means including a defined and enclosed air passage, and
first and second aperture sections provided on different housing surfaces from each other for exhausting air from said housing, said first and second aperture sections communicating with the same said defined and enclosed air passage but respectively exhausting air from the same said air passage in generally perpendicular air path directions.

6. A cooling method of the projection apparatus as claimed in claim 5, wherein at least one of said air outlets is provided on a bottom surface side of said housing so as to form said passage of heat between an arrangement surface and a bottom surface when said housing is arranged.

7. A cooling method of the projection apparatus as claimed in claim 6, wherein at least one of said air outlets being provided on a rear surface side of said housing.

8. A cooling method of the projection apparatus as claimed in claim 7, wherein said air outlets include a first air outlet provided on a first surface out of a plurality of surfaces of said housing, and a second air outlet provided on a second surface except said first surf ace of said housing.

* * * * *